United States Patent
Wang et al.

(10) Patent No.: US 7,018,113 B1
(45) Date of Patent: Mar. 28, 2006

(54) OPTICAL MODULE PACKAGE

(75) Inventors: Jianhua Wang, Saratoga, CA (US);
Qinglin Wang, San Jose, CA (US);
Yanyan Ma, San Ramon, CA (US);
Hongtao Hou, Sunnyvale, CA (US);
Alex Chun-Lai Hsu, Fremont, CA (US)

(73) Assignee: OptiWorks, Inc., Fremont, CA (US)

( * ) Notice: Subject to any disclaimer, the term of this patent is extended or adjusted under 35 U.S.C. 154(b) by 148 days.

(21) Appl. No.: 10/718,355

(22) Filed: Nov. 18, 2003

(51) Int. Cl.
*G02B 6/36* (2006.01)

(52) U.S. Cl. .......................................... 385/92; 385/109

(58) Field of Classification Search .................. 385/92, 385/25, 39, 52, 89, 109
See application file for complete search history.

(56) References Cited

U.S. PATENT DOCUMENTS

| | | | |
|---|---|---|---|
| 4,416,499 A | 11/1983 | Frascatore et al. | |
| 4,468,168 A | 8/1984 | Aubert | |
| 4,859,025 A | 8/1989 | Houghton | |
| 5,189,724 A | 2/1993 | Hartley | |
| 5,758,004 A | 5/1998 | Alarcon et al. | |
| 5,838,871 A | 11/1998 | Libert et al. | |
| 6,014,490 A | 1/2000 | Canning et al. | |
| 6,118,914 A | 9/2000 | Davis et al. | |
| 6,195,494 B1 | 2/2001 | Abbott et al. | |
| 6,293,708 B1 * | 9/2001 | Ohtsuka et al. | 385/72 |
| 6,321,021 B1 | 11/2001 | Cairns et al. | |
| 6,334,020 B1 | 12/2001 | Fujimori et al. | |
| 6,377,735 B1 | 4/2002 | Bernstein et al. | |
| 6,394,662 B1 * | 5/2002 | Foster | 385/60 |
| 6,415,092 B1 | 7/2002 | Crespel et al. | |
| 6,424,784 B1 | 7/2002 | Olson | |
| 6,504,989 B1 | 1/2003 | Gooding | |
| 6,517,253 B1 * | 2/2003 | Graesser | 385/58 |
| 6,571,047 B1 | 5/2003 | Yarkosky et al. | |
| 6,688,782 B1 * | 2/2004 | Dean, Jr. et al. | 385/78 |

* cited by examiner

*Primary Examiner*—Kaveh Kianni
(74) *Attorney, Agent, or Firm*—Law Office of Andrei D. Popovici, P.C.

(57) ABSTRACT

In at least some embodiments, an optical module package includes a housing, a plurality of optical fiber cables connected to the housing, and optical fiber connectors terminating each cable. Each optical fiber cable may include an optical fiber, two concentric flexible protective tubes enclosing the fiber, and aramid (e.g. Kevlar®) fibers disposed between the protective tubes. Each protective tube is capable of longitudinally sliding relative to the optical fiber along at least part of the cable, to release stresses resulting from differential thermal expansion of the optical fiber and the protective tubes. Each optical fiber may be held fixed relative to the housing and distal connectors, and one or both of the ends of the protective tubes may be free to move. The protective tubes may also be held fixed relative to the housing, and the optical fiber(s) allowed to move within the housing.

21 Claims, 4 Drawing Sheets

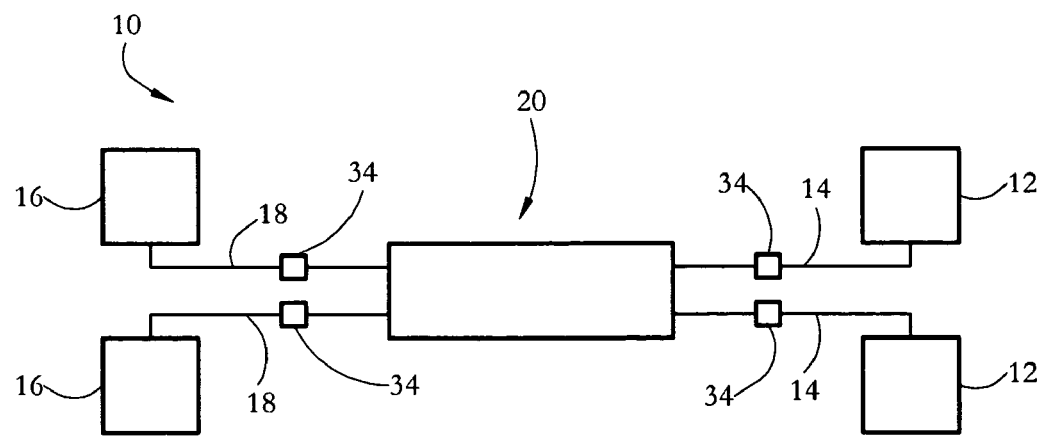
FIG. 1-A
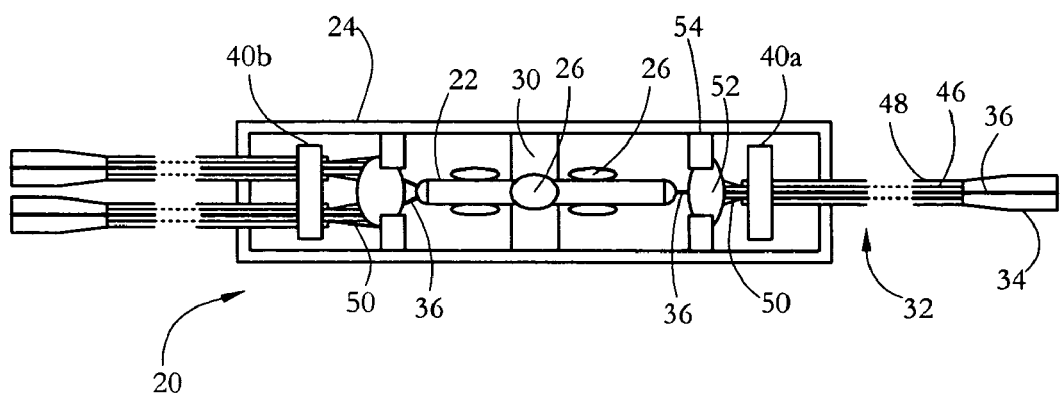
FIG. 1-B

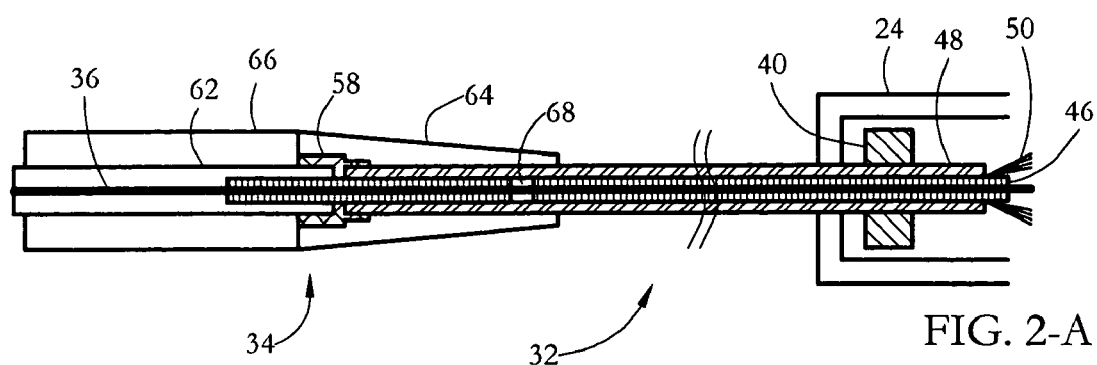
FIG. 2-A
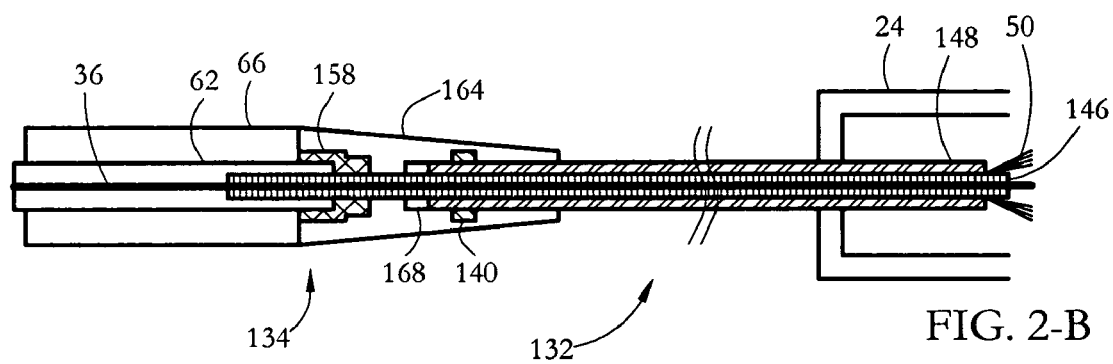
FIG. 2-B
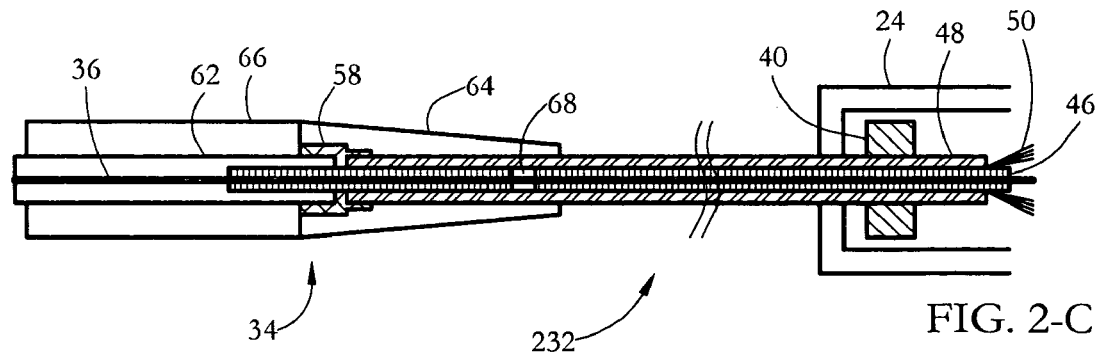
FIG. 2-C

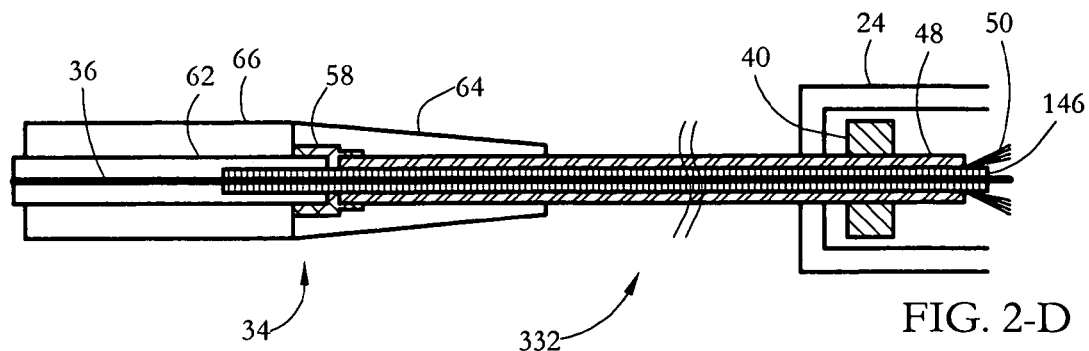
FIG. 2-D
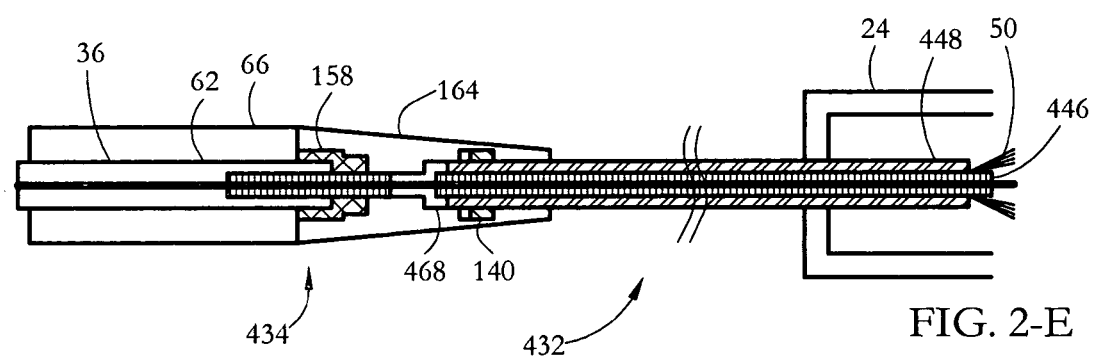
FIG. 2-E
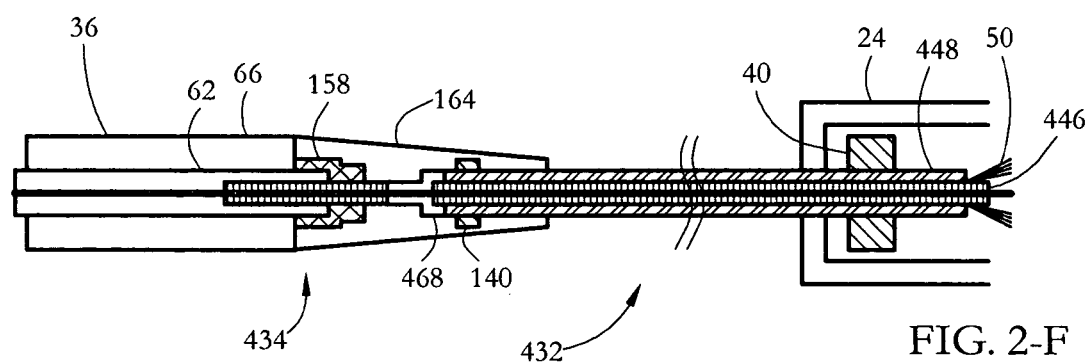
FIG. 2-F

OPTICAL MODULE PACKAGE

FIELD OF THE INVENTION

The invention in general relates to optical systems and methods, and in particular to optical module packages capable of operating in harsh environments.

BACKGROUND

Optical module packages holding optical or optoelectronic components are used for a variety of applications, including fiber optic communications. Such optical module packages may include fiber couplers, splitters, isolators, circulators, attenuators, switches, wavelength multiplexing or demultiplexing (WDM) components, and other optical components known in the art.

An optical module package may include a housing, one or more optical fiber cables connected to the housing, and corresponding optical fiber connectors connected at the distal ends of the cables. Each fiber cable may include an optical fiber, and a protective tube disposed over the optical fiber. Optical fibers normally require careful handling to avoid physically damaging the fibers or otherwise degrading the transmission performance of the fibers. For example, bending or stressing optical fibers can degrade the transmission properties of the fibers even if the fibers do not break. Providing adequate protection to optical fibers is of particular concern for optical module packages designed to operate in harsh environments.

SUMMARY OF THE INVENTION

In one embodiment, an optical module package comprises a housing, a plurality of optical fiber connectors; and a plurality of optical fiber cables. Each of the optical fiber cables connects the housing and a corresponding optical fiber connector. Each of the optical fiber cables comprises an optical fiber rigidly connected to the housing and to its corresponding optical fiber connector, a flexible inner protective tube enclosing the optical fiber, and a flexible concentric outer protective tube enclosing the inner protective tube. The inner protective tube and the outer protective tube are longitudinally movable relative to the optical fiber along at least part of the optical fiber in response to environmental temperature changes, to reduce a strain on the optical fiber caused by thermal expansion of the inner protective tube and the outer protective tube.

In another embodiment, the optical fiber is capable of longitudinally moving relative to the inner protective tube, the outer protective tube, and the housing in response to environmental temperature changes. Longitudinally moving the optical fiber varies an extent of the optical fiber present in the interior of the housing.

BRIEF DESCRIPTION OF THE DRAWINGS

The foregoing aspects and advantages of the present invention will become better understood upon reading the following detailed description and upon reference to the drawings where:

FIG. 1-A is a schematic diagram of an optical system including an optical module package according to an embodiment of the present invention.

FIG. 1-B shows an optical fiber coupler package according to an embodiment of the present invention.

FIGS. 2-A–F show the proximal and distal ends of a fiber optic cable according to various embodiments of the present invention.

DETAILED DESCRIPTION OF THE INVENTION

Figure 3:
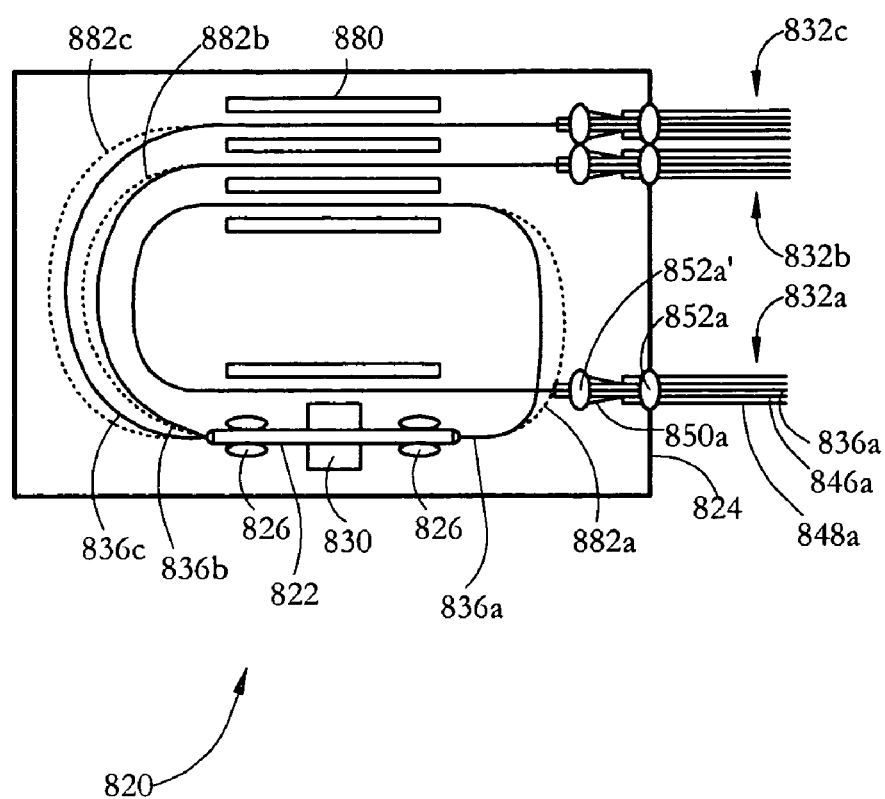
FIG. 3 is a schematic diagram of an optical fiber coupler package according to another embodiment of the present invention.

In the following discussion, a set of elements is understood to include one or more elements. A plurality of elements includes at least two elements. Moving a first element relative to a second element encompasses moving the first element, the second element, or both. Unless specified otherwise, any recited element may be formed from multiple monolithic structures, or may form part of a larger monolithic structure. For example, a protective tube may include multiple monolithic layers of material. Any recited connection may be a direct connection, or an indirect connection through an intermediary element. For example an optical fiber affixed or connected to a housing may be connected to the housing directly, or indirectly through a support that forms part of the housing or is situated within the housing. Unless specified otherwise, the terms proximal and distal are used to refer to relationships with respect to an optical module package housing.

The following description illustrates embodiments of the invention by way of example and not necessarily by way of limitation.

FIG. 1-A shows a schematic diagram of an optical system 10 including an optical module package 20, according to an embodiment of the present invention. Optical system 10 may be an optical communications system. Optical system 10 includes one or more optical source(s) 12 and one or more optical receivers 16 connected to optical module package 20 through input and output optical fibers 14, 18. Optical module package 20 comprises a plurality of connectors 34 connected to optical fibers 14, 18. Optical fibers 14, 18 are provided as part of optical fiber cables. In general, optical module packages such as optical module package 20 may include fiber couplers, splitters, isolators, circulators, attenuators, switches, wavelength multiplexing or demultiplexing (WDM) components, and other optical components known in the art. Generally, optical module package 20 may have one or more optical inputs, and one or more optical outputs.

Optical source 12 directs a modulated light beam through input fiber 14 to optical module package 20, and optical receivers 16 receive the light beam after passage through optical module package 20 and output fibers 18. The light beam may comprise multiple channels each encoding a communications signal. Source 12 may include one or more lasers or laser diodes, optical fibers, and other optical components (e.g. WDM/DWDM components) between the laser(s) and optical module package 20. Each receiver 18 may include one or more detectors, optical fibers, and other optical components between the detector and optical module package 20.

As shown in FIG. 1-B, in an embodiment in which optical module package 20 is a 1×2 fiber coupler package, optical module package 20 may include a housing 24, and various components situated inside housing 24. Housing 24 and the various components situated within housing 24 form a housing assembly. A fused fiber coupler 22 is affixed inside housing 24 by adhesive 26. Fiber coupler 22 is also held in place between lateral supports 30. Fiber coupler 22 is connected to input and output optical fibers, e.g. one input and two output optical fibers, as shown in FIG. 1-B. A plurality of flexible optical fiber cables 32 extend through housing 24, and terminate in corresponding optical connectors 34. One input and two output fiber cables are shown in FIG. 1-B. A pair of U-shaped metal stoppers (guides) 40*a–b* are disposed on opposite sides of fiber coupler 22. Each stopper 40*a–b* is affixed to the outside of its corresponding optical fiber cable 32, for example by adhesive. Each stopper 40*a–b* is capable of sliding longitudinally within housing 24. Stoppers 40*a–b* extend over fiber cables 32, so as to transversely constrain fiber cables 32. Stopper 40*a* extends over a single input cable 32, while stopper 40*b* extends over two output cables 32. Stoppers 40*a–b* constrain the outer layers of cables 32 to move only longitudinally within housing 24. Stopper 40*b* keeps its two corresponding cables 32 aligned and parallel. Stoppers 40*a–b* provide added stability and strength against lateral and twisting forces applied to cables 32. Stoppers 40*a–b* may also prevent the outer cable layers from exiting housing 24.

Each optical fiber cable 32 preferably includes an optical fiber 36, polymeric protective tubes (covers) 46, 48 disposed concentrically around optical fiber 36, and a sliding/support medium 50 disposed between protective tubes 46, 48. Each protective tube 46, 48 is a loose tube that is laterally-flexible and locally longitudinally-rigid—i.e. it may bend, but does not ordinarily crumple. An inner protective tube 46 encloses optical fiber 36, while an outer protective tube 48 encloses inner protective tube 46. The inner diameter of protective tube 46 substantially matches the outer diameter of optical fiber 36, such that optical fiber 36 does not bend independently of protective tube 46, but is capable of sliding within inner protective tube 46. Similarly, the inner diameter of protective tube 48 substantially matches the outer diameter of protective tube 46, such that protective tube 46 does not bend independently of protective tube 48. Sufficient space is available between the two protective tubes to fit sliding medium 50 and to allow protective tubes 46, 48 to slide relative to each other. Protective tubes 46, 48 and sliding/support medium 50 extend between connector 34 and the interior of housing 24, through an aperture formed in the wall of housing 24. Protective tubes 46, 48 serve to protect optical fiber 36 from external forces that could damage optical fiber 36. Sliding/support medium 50 serves to allow protective tubes 46, 48 to slide longitudinally relative to each other. Sliding/support medium 50 also provides additional protection to optical fiber 36, particularly within housing 24.

Each optical fiber 36 and its corresponding sliding/support medium 50 are affixed to housing 24 by adhesive 52. Adhesive 52 may be placed between support protrusions 54 extending inside housing 24. Support protrusions 54 may be integrally formed with two opposite walls of housing 24, or may include discrete pieces attached to the inside walls of housing 24. In some embodiments, adhesive 52 may also affix one or both of protective tubes 46, 48 to housing 24, as described below.

Each optical fiber 36 may be a conventional fiber including a silica fiber core, a silica fiber cladding disposed around the core, and a protective polymer coating adhered to the fiber cladding. Protective tubes 46, 48 may be made of known organic substances such as polytetrafluoroethylene (PTFE, Teflon®), poly(tetramethylene glycol) poly(butylene terephthalate) (Hytrel®), unplasticized poly(vinyl chloride) (PVC-u), or other polymeric materials. Sliding medium 50 may be formed by aramid (aromatic polyamide) fibers, such as fibers made of poly-(p-phenylene terephtalamide), commonly known by the trade name Kevlar®. Housing 24 may include one or more suitable materials such as metals (e.g. aluminum) or plastics. Adhesive 52 may be an epoxy. Stoppers 40 may be formed of a metal such as aluminum, or other rigid materials.

Each optical fiber cable 32 may have a length on the order of centimeters to meters or longer, for example about 3–10 m. Each optical fibers 36*a–b* may have diameters on the order of hundreds of μm, for example about 250 μm. Protective tubes 46, 48 may have diameters on the order of hundreds of μm to mm. In an exemplary implementation, inner protective tube 46 has an outer diameter of about 900 μm (~1 mm), while outer protective tube 48 has an outer diameter of about 3 mm. In an exemplary embodiment, housing 24 has a length on the order of a few cm, and a width and height of about 1 cm.

To assemble optical module package 20, any internal optical components (e.g. fiber coupler 22) are positioned within housing 24, and optical fibers 36 are inserted through their corresponding apertures in the walls of housing 24. Protective tubes 46, 48 and sliding/support media 50 are slid over optical fibers 36. Stoppers 40*a–b* are secured to outer tubes 48, and sliding/support media 50 and optical fibers 36 are secured to housing 24. Connectors 34 are assembled at the distal ends of optical fibers 36.

FIG. 2-A–F illustrate a number ways of designing and connecting an optical fiber cable having two movable protective tubes, according to various embodiments of the present invention. FIG. 2-A shows a longitudinal sectional view of the distal and proximal regions of an optical fiber cable 32, and a connector 34 connected to cable 32 along a distal region of cable 32, according to an embodiment of the present invention. In the illustrated embodiment, inner protective tube 46 is free to move at its distal end, while outer protective tube 48 is free to move at its proximal end.

Connector 34 may be a conventional fiber optic connector such as a Seiko Instruments SMU-P Series MU connector. For clarity, an exemplary connector 34 is illustrated in FIG. 2-A schematically. A conventional connector may include features such as outer keyed protrusions for mating the connector externally, a longitudinal spring for allowing a connector casing to move relative to a connector ferrule or fiber, and/or a spring cover (spring push) for pressing the spring against the ferrule. Various connector designs suitable for use in embodiments of the present invention are known in the art.

Connector 34 includes a crimp ring 58 having a proximal tubular aperture sized to fit over outer protective tube 48, and a distal tubular aperture sized to fit over a ferrule 62 or another fixed connector structure (e.g. a spring cover). Crimp ring 58 secures optical fiber cable 32 to connector 34. The two opposite-facing apertures of crimp ring 58 are separated by an annular stop which abuts a transverse surface of outer protective tube 48. Inner protective tube 46 passes through a central aperture defined in the annular stop of crimp ring 58. Ferrule 62 is disposed over optical fiber 36. A connector casing 66 is disposed over ferrule 62. A connector boot 64 is disposed over crimp ring 58 and outer protective tube 48. Boot 64 provides additional protection to optical fiber 36, and prevents excessive bending of cable 32.

An annular gap 68 divides inner protective tube 46 into longitudinally-separated proximal and distal parts. Each of the proximal and distal parts is itself a protective tube. Preferably, gap 68 is situated within boot 64, to minimize any loss of stability or fiber protection due to gap 68. Generally, one or more gaps such as gap 68 may be situated outside of boot 64, particularly if a relatively long cable is employed. Gap 68 preferably has a length sufficient to accommodate the thermal expansion of inner protective tube 46 relative to optical fiber 36. At the same time, gap 68 is preferably not so wide as to compromise the protective properties of inner protective tube 46. In an exemplary embodiment, gap 68 has a length on the order of mm, preferably about 1–10 mm, for example about 4 mm. An optimal length for gap 68 may depend on the length of inner protective tube 48, the number and positioning of any other gaps, and the thermal expansion coefficients of inner protective tube 48 and optical fiber 36.

Inner protective tube 46 is secured at its proximal end to housing 24 by adhesive or a fastener. Sliding medium 50 is secured at its proximal end to housing 24, and at its distal end to connector 34. Sliding medium 50 may be secured at its proximal end by adhesive, and at its distal end by crimp ring 58. The proximal end of outer protective tube 48 is free to move longitudinally within housing 24, together with and constrained by stopper 40. The distal end of outer protective tube 48 is fixed within connector 34 crimp ring 58. Both inner protective tube 46 and outer protective tube 48 are capable of sliding longitudinally with respect to optical fiber 36 as the environmental temperature around cable 32 changes. Preferably, differential thermal expansion does not impart significant stresses on optical fiber 36 within a temperature range of −40° C. to +85° C.

Table 1 shows approximate thermal expansion coefficients (CTEs) for a number of materials suitable for use in the present invention:

TABLE 1

| Material | CTE |
|---|---|
| $SiO_2$ | ~5 × $10^{-7}$/° C. |
| polytetrafluoroethylene (PTFE, Teflon ®) | ~9.9 × $10^{-5}$/° C. |
| poly(tetramethylene glycol) poly(butylene terephthalate) (Hytrel ®) | ~6.5 × $10^{-5}$/° C. |
| unplasticized poly(vinyl chloride) (PVC-u) | ~7 × $10^{-5}$/° C. |
| various other polymeric materials | ~40–200 × $10^{-6}$/° C. |

The exemplary numbers shown in Table 1 are not intended to limit the scope of the present invention. As Table 1 shows, polymeric materials generally have thermal expansion coefficients one to two orders of magnitude higher than silicon dioxide. For a conventional silicon dioxide optical fiber 36, the thermal expansion coefficient of the optical fiber (formed by the optical fiber core, cladding, and coating) may be similar to that of the silicon dioxide core and cladding alone. Generally the thermal expansion coefficient of a silicon dioxide optical fiber is lower than that of polymeric materials. For an optical fiber cable having a length of 1 m, a temperature change of 100° C. could yield a change in the protective tube length on the order of several mm to cm. Over the same temperature range, the optical fiber itself may change by less than 1 mm. Optical module package 20 is preferably capable of operating over such a wide temperature range without degrading the performance of the optical fiber.

Allowing outer protective tube 48 to move at its proximal end, within housing 24, rather than within connector 34 or between connector 34 and housing 24, may provide increased stability and protection to optical fiber 36. Allowing inner protective tube 46 to move at its distal end, within connector 34, may reduce assembly problems by providing improved access to inner protective tube 46 during its connection at the movable end. If the end of inner protective tube 46 were to slide within outer protective tube 48 during assembly, retrieving the end of inner protective tube 46 may be easier at the distal end of cable 32 than within housing 24.

FIG. 2-B shows a longitudinal sectional view of the distal and proximal regions of an optical fiber cable 132, and a connector 134 connected to cable 132 along a distal region of cable 132, according to an embodiment of the present invention. Optical fiber 36 is enclosed by two concentric, continuous, inner and outer protective tubes 146, 148, respectively. Inner protective tube 146 and sliding medium 50 are affixed at their distal ends to an optical fiber connector 134. The proximal end of inner protective tube 146 is free to slide longitudinally with respect to optical fiber 36 and outer protective tube 148, so as to accommodate changes in the length of inner protective tube 146 due to thermal expansion. The proximal ends of outer protective tube 148 and sliding medium 50 are affixed to housing 24. The distal end of outer protective tube 148 is free to move longitudinally with respect to optical fiber 36 and inner protective tube 146, so as to accommodate changes in the length of outer protective tube 148 due to thermal expansion. A stopper 140 is secured to the outside outer protective tube 148, for ensuring that outer protective tube 148 does not slide out of connector 34. Stopper 140 is free to move longitudinally within a limited range within a connector boot 164. A longitudinal gap 168 is provided between the distal transverse end surface of outer protective tube 148 and the transverse surface of connector boot 164 facing the distal transverse end surface of outer protective tube 148. A crimp ring 158 as described above is used to secure inner protective tube 146, but not outer protective tube 148.

FIG. 2-C shows a longitudinal sectional view of the distal and proximal regions of an optical fiber cable 232, according to another embodiment of the present invention A connector 34 as described above is connected to cable 232 along a distal region of cable 232. Cable 232 is similar to the cable 32 described with reference to FIG. 2-A, except that the proximal end of inner protective tube 46 is free to move rather than fixed.

FIG. 2-D shows a longitudinal sectional view of the distal and proximal regions of an optical fiber cable 332, according to another embodiment of the present invention. Cable 232 is similar to the cable 32 described with reference to FIG. 2-A, except that it includes a continuous inner protective tube 146 having its distal end fixed with respect to connector 34, and its proximal end free to move with respect to optical fiber 36 and outer protective tube 48.

FIG. 2-E shows a longitudinal sectional view of the distal and proximal regions of an optical fiber cable 432, according to yet another embodiment of the present invention. Cable 432 includes an inner protective tube 446 and an outer protective tube 448 which are free to move at their distal ends, and fixed at their proximal ends. An annular gap 468, situated within a connector 434, accommodates the thermal expansion of protective tubes 446, 448.

FIG. 2-F shows a longitudinal sectional view of the distal and proximal regions of optical fiber cable 432, according to still another embodiment of the present invention. In the embodiment illustrated in FIG. 2-F, both proximal and distal ends of both protective tubes 446, 448 are free to move. An annular gap 468 accommodates the thermal expansion of protective tubes 446, 448 relative to optical fiber 36. Guides 40, 140 are provided at both ends of cable 432, within housing 24 and connector 434.

FIG. 3 shows a fiber coupler optical module package 820 according to another embodiment of the present invention. The configuration of FIG. 3 may be used for optical components other than fiber couplers, as described above. A fused fiber coupler 822 is affixed inside a housing 824 by adhesive 826. Fiber coupler 822 is also held in place between lateral supports 830. Fiber coupler 822 connects an input fiber 836a to two output fibers 836b–c. A plurality of external optical fiber cables 832a–c extend through housing 24, and terminate in corresponding optical fiber connectors situated outside housing 24. In general, the optical fiber connectors may have any of the configurations described above with respect to FIGS. 2-A–F. Preferably, the optical fiber connectors are rigidly connected to the various optical fiber cable layers/components described below.

Each optical fiber cable 832a–c includes a corresponding optical fiber 836a–c. The following discussion focuses on an exemplary optical fiber cable 832a. Optical fiber cables 832b–c are preferably identical to optical fiber cable 832a. Optical fiber cable 832a includes polymeric protective tubes (covers) 846a, 848a disposed concentrically around optical fiber 836a, and a sliding/support medium 850a disposed between protective tubes 846a, 848a. An inner protective tube 846a encloses optical fiber 836a, while an outer protective tube 848a encloses inner protective tube 846a. Protective tubes 846a, 848a and sliding medium 850a are affixed to housing 24 by adhesive 852a, 852a'. A first adhesive mass 852a secures outer protective tube 848a to housing 24, while a second adhesive mass 852a' secures inner protective tube 846a and sliding medium 850a to housing 24. Optical fiber 832a is free to move longitudinally with respect to protective tubes 846a, 848a. Preferably, the distal ends of protective tubes 846a, 848a are also secured to corresponding optical fiber connectors. Securing both ends of protective tubes 846a, 848ab may provide increased stability and robustness to optical module package 820.

A plurality of parallel guide rails 880 are disposed within housing 824 so as to constrain the internal position of optical fibers 836a–c within housing 824, as fibers 836a–c move with respect to housing 824. The shape of each optical fiber 836a–c within housing 824 includes at least one bend or loop for accommodating the optical fiber 836a–c, as the length of the optical fiber 836a–c within housing 824 changes, for example in response to environmental temperature changes. Alternative positions for fibers 836a–c are shown by the dashed lines 882a–c, respectively. Guide rails 880 and fiber coupler 822 constrain the orientation of each fiber 836a–c at least two laterally-separated locations separated by a bend. The orientation of each fiber 836a–c at one of the constraint locations is opposite to the orientation at the other constraint location. Guide rails 880 serve to prevent fibers 836a–c from touching the walls of housing 24, thus reducing the force needed to confine fibers 836a–c within housing 24. If fibers 836a–c were allowed to move freely laterally within housing 24, contact with housing 24 could lead to degradation of the transmission properties of the fibers.

It will be clear to one skilled in the art that the above embodiments may be altered in many ways without departing from the scope of the invention. For example, a sliding medium is not necessarily required between the inner and outer protective tubes. Various materials other than the ones exemplified above may be used for optical fibers, protective tubes, and sliding media. Multiple gaps or cuts may be provided within one or more of the protective tubes, particularly for long optical fiber cables. An optical module package may be connected to M×N optical fiber cables, where M, N>0. Accordingly, the scope of the invention should be determined by the following claims and their legal equivalents.

What is claimed is:

1. An optical module package comprising:
a housing;
a plurality of optical fiber connectors; and
a plurality of optical fiber cables, each of the optical fiber cables connecting the housing and a corresponding optical fiber connector, said each of the optical fiber cables comprising
an optical fiber rigidly connected to the housing and to the corresponding optical fiber connector,
a flexible inner protective tube enclosing the optical fiber, and
a flexible outer protective tube enclosing the inner protective tube, wherein the inner protective tube and the outer protective tube are longitudinally movable relative to the optical fiber along at least a part of the optical fiber enclosed by the inner protective tube and the outer protective tube in response to environmental temperature changes, to reduce a strain on the optical fiber caused by thermal expansion or contraction of the inner protective tube and the outer protective tube.

2. The optical module package of claim 1, wherein the inner protective tube comprises at least two distinct segments separated by a longitudinal gap.

3. The optical module package of claim 1, wherein the inner protective tube comprises an inner tube region situated within the housing and longitudinally movable relative to the housing.

4. The optical module package of claim 3, wherein a region of the inner protective tube proximal to the corresponding optical fiber connector is rigidly connected to the corresponding optical fiber connector.

5. The optical module package of claim 3, wherein the outer protective tube comprises an outer tube region situated within the housing and longitudinally movable relative to the housing.

6. The optical module package of claim 3, wherein a region of the outer protective tube proximal to the corresponding optical fiber connector is longitudinally movable relative to the corresponding optical fiber connector.

7. The optical module package of claim 1, wherein a region of the inner protective tube proximal to the corresponding optical fiber connector is longitudinally movable relative to the corresponding optical fiber connector.

8. The optical module package of claim 7, wherein the inner protective tube comprises an inner tube region situated within the housing and rigidly connected to the housing.

9. The optical module package of claim 7, wherein the outer protective tube comprises an outer tube region situated within the housing and longitudinally movable relative to the housing.

10. The optical module package of claim 7, wherein a region of the outer protective tube proximal to the corresponding optical fiber connector is longitudinally movable relative to the corresponding optical fiber connector.

11. The optical module package of claim 1, wherein the outer protective tub; comprises a outer tube region situated within the housing and longitudinally movable relative to the housing.

12. The optical module package of claim 1, wherein a region of the outer protective tube proximal to the corresponding optical fiber conductor is longitudinally movable relative to the corresponding optical fiber connector.

13. The optical module package of claim 1, further comprising a longitudinal guide disposed over the outer protective tube, for constraining the outer protective tube solely to a longitudinal motion within the housing.

14. The optical module package or claim 1, wherein said each of the optical fiber cables comprises a flexible sliding medium disposed between the inner protective tube and the outer protective tube.

15. The optical module package of claim 14, wherein the sliding medium comprises aramid fibers.

16. The optical module package of claim 14, wherein the sliding medium is affixed to the housing and to the corresponding optical fiber connector.

17. The optical module package of claim 1, further comprising a fused fiber coupler situated within the housing and rigidly connected to the optical fiber.

18. The optical module package of claim 1, further comprising an optical component situated within the housing and optically coupled to the optical fiber, the optical component being selected from a group consisting of splitters, isolators, circulators, attenuators, switches, and wavelength multiplexing and demultiplexing components.

19. The optical module package of claim 1, wherein each of the inner protective tube and the outer protective tube has a length on the order of meters.

20. The optical module package of claim 1, wherein each of the inner protective tube and the outer protective tube is longer than or equal in length to 3 m.

21. An optical system comprising:
an optical source;
an optical receiver; and
an optical module package optically connecting the optical source to the optical receiver, the optical module package comprising
a housing;
a plurality of optical fiber connectors including a first connector connected to the optical source, and a second connector connected to the optical receiver; and
a plurality of optical fiber cables, each of the optical fiber cables connecting the housing and a corresponding optical fiber connector, said each of the optical fiber cables comprising
an optical fiber rigidly connected to the housing and to the corresponding optical fiber connector,
a flexible outer protective tube enclosing the optical fiber, and
a flexible outer protective tube enclosing the inner protective tube, wherein the inner protective tube and the outer protective tube arc longitudinally movable relative to the optical fiber along at least a part of the optical fiber enclosed by the inner protective tube and the outer protective tube in response to environmental temperature changes, to reduce a strain on the optical fiber caused by thermal expansion or contraction of the inner protective tube and the outer protective tube.

* * * * *